United States Patent
George et al.

(10) Patent No.: US 11,585,230 B2
(45) Date of Patent: Feb. 21, 2023

(54) ASSEMBLY FOR A TURBOMACHINE

(71) Applicant: SAFRAN AIRCRAFT ENGINES, Paris (FR)

(72) Inventors: Alexis Hector Ulysse George, Moissy-Cramayel (FR); Christophe Scholtes, Moissy-Cramayel (FR); Antoine Robert Alain Brunet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/422,945

(22) PCT Filed: Jan. 13, 2020

(86) PCT No.: PCT/HR2020/000009
§ 371 (c)(1),
(2) Date: Jul. 14, 2021

(87) PCT Pub. No.: WO2020/148489
PCT Pub. Date: Jul. 23, 2020

(65) Prior Publication Data
US 2022/0065124 A1 Mar. 3, 2022

(30) Foreign Application Priority Data

Jan. 14, 2019 (FR) ..................................... 1900322
Jan. 17, 2019 (FR) ..................................... 1900420

(51) Int. Cl.
*F01D 11/12* (2006.01)
(52) U.S. Cl.
CPC ........ *F01D 11/122* (2013.01); *F05D 2220/32* (2013.01); *F05D 2240/55* (2013.01)

(58) Field of Classification Search
CPC . F01D 11/122; F05D 2220/32; F05D 2240/55
See application file for complete search history.

(56) References Cited

U.S. PATENT DOCUMENTS 4,295,785 A * 10/1981 Lardellier ............. F01D 11/001
277/421
6,409,472 B1 * 6/2002 McMahon ............ F01D 25/246
415/189

(Continued)

FOREIGN PATENT DOCUMENTS

EP 1712743 A2 10/2006
EP 3023595 A1 5/2016

(Continued)

OTHER PUBLICATIONS

International Patent Application No. PCT/FR2020/000009, International Search Report and Written Opinion dated May 7, 2020, 15 pgs.

(Continued)

*Primary Examiner* — Igor Kershteyn
*Assistant Examiner* — Theodore C Ribadeneyra
(74) *Attorney, Agent, or Firm* — Lathrop GPM LLP

(57) ABSTRACT

The invention relates to an assembly for a turbomachine, comprising a stator (1) and a rotor (2) rotatable relative to the stator (1) about an axis, the rotor (2) comprising blades each xcomprising a vane (3) connected to a radially inner platform (5), a block of abradable material (6) extending radially inwardly from the radially inner platform (5) the stator (1) having a shroud comprising an annular area (9), at least one lug (12) extending radially outwardly from said annular area (9), the radially outer end of the lug (12) cooperating with the block of abradable material (6).

19 Claims, 3 Drawing Sheets

(56) References Cited

U.S. PATENT DOCUMENTS

| | | | | |
|---|---|---|---|---|
| 2003/0107181 A1* | 6/2003 | Wieghardt | ............. | F01D 11/02 277/415 |
| 2007/0273104 A1* | 11/2007 | Kovac | ................... | F01D 11/122 277/414 |
| 2008/0075600 A1* | 3/2008 | Moors | ................... | F01D 11/122 416/189 |
| 2013/0236298 A1* | 9/2013 | Chouhan | ................ | F01D 11/02 29/889.22 |
| 2014/0191476 A1* | 7/2014 | Bricaud | ............... | F01D 11/025 277/412 |
| 2014/0205444 A1 | 7/2014 | Zheng et al. | | |
| 2015/0275674 A1* | 10/2015 | Alvarez Garcia | .... | F01D 11/001 416/95 |
| 2016/0138413 A1* | 5/2016 | Cortequisse | ............ | F01D 9/041 415/173.1 |
| 2016/0215646 A1* | 7/2016 | Gonyou | ................. | F01D 11/18 |
| 2017/0058689 A1* | 3/2017 | Gaebler | ................ | F01D 11/122 |
| 2017/0282311 A1* | 10/2017 | Moullet | ............... | B23P 15/006 |
| 2018/0031000 A1* | 2/2018 | Alban | ................... | F01D 11/127 |
| 2018/0058232 A1* | 3/2018 | Oikawa | ................ | F01D 11/122 |
| 2018/0230841 A1* | 8/2018 | Itzel | ........................ | F01D 5/225 |
| 2018/0347579 A1* | 12/2018 | Hiernaux | ............. | F04D 29/164 |
| 2018/0355744 A1* | 12/2018 | Jakimov | ................ | F16J 15/444 |
| 2019/0010820 A1* | 1/2019 | Scherer | ................ | F01D 11/001 |

FOREIGN PATENT DOCUMENTS

| | | | | |
|---|---|---|---|---|
| EP | 3168427 A1 | 5/2017 | | |
| EP | 3392464 A1 | 10/2018 | | |
| EP | 3409902 A1 | 12/2018 | | |
| EP | 3412875 A2 * | 12/2018 | ............... | B22F 5/00 |
| WO | WO 2015/092281 A1 | 6/2015 | | |
| WO | WO-2017142011 A1 * | 8/2017 | ............. | F01D 11/02 |

OTHER PUBLICATIONS

French Patent Application No. 1900322, Search Report dated Oct. 3, 2019; 8 pgs.

French Patent Application No. 1900420, Search Report dated Jan. 7, 2020; 8 pgs.

* cited by examiner

[Fig. 1]
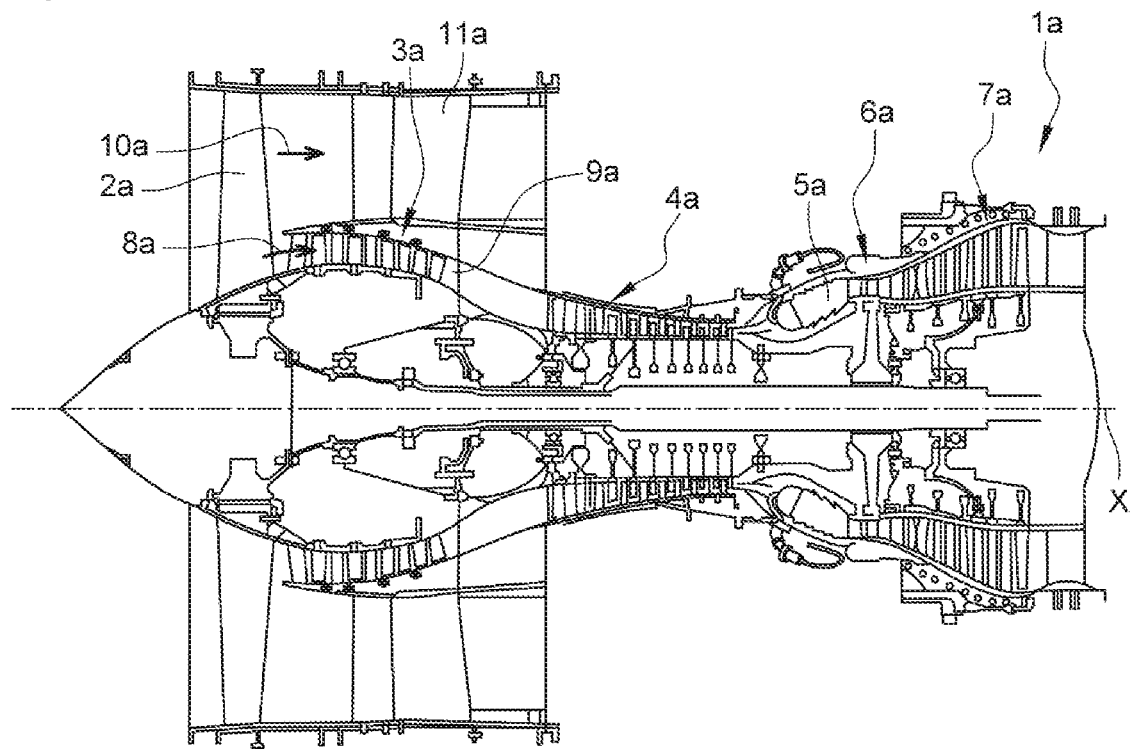
[Fig. 2]
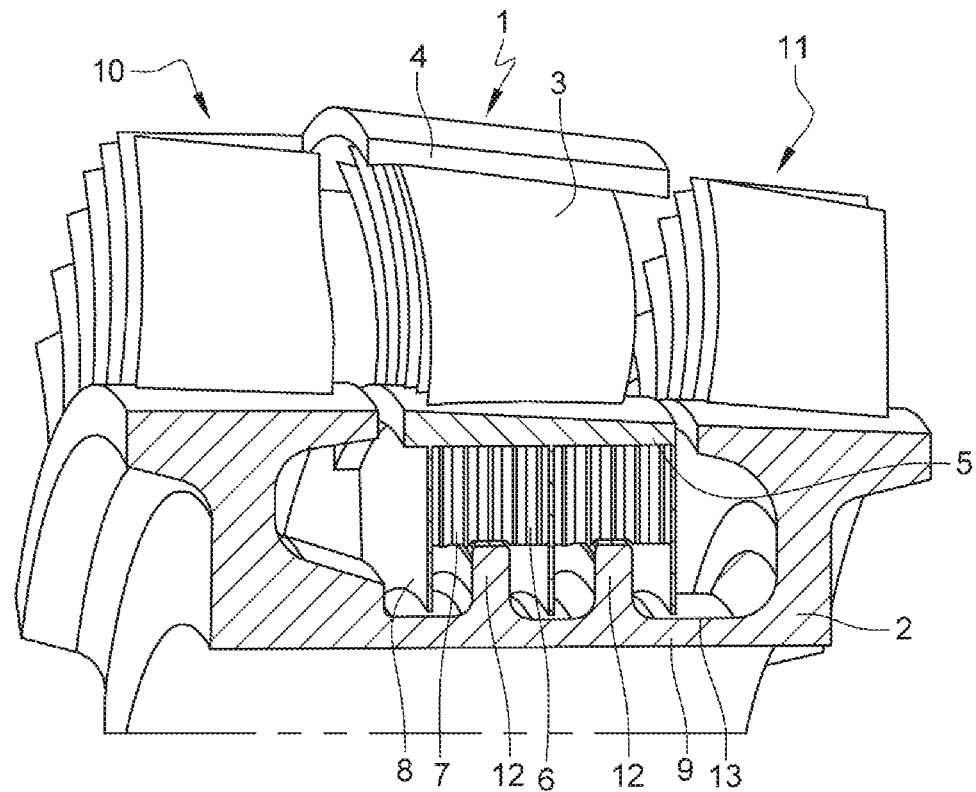

[Fig. 3]
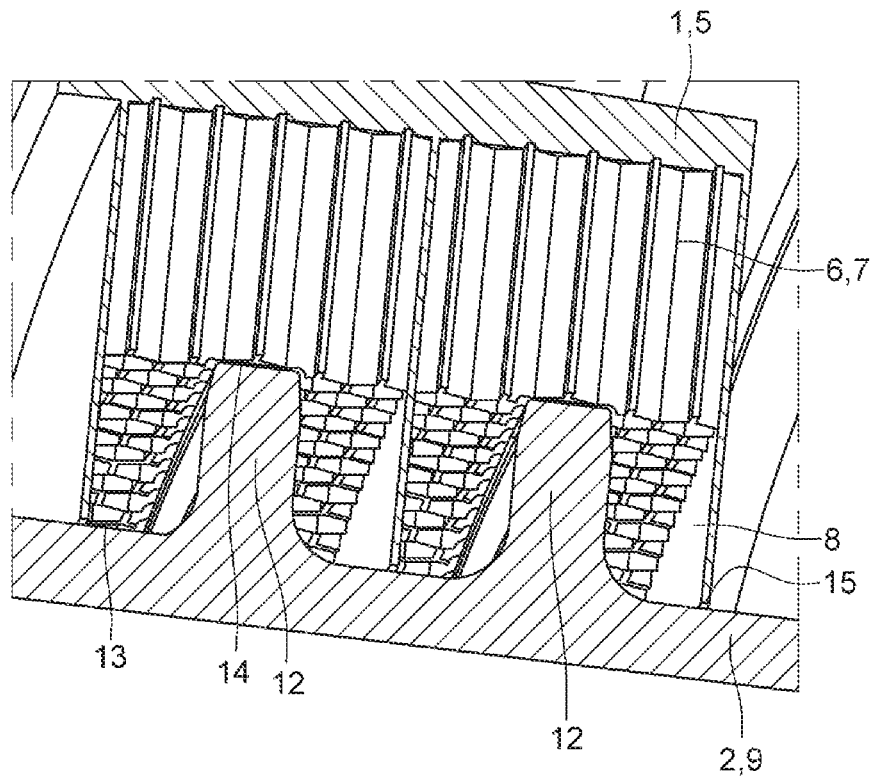
[Fig. 4]
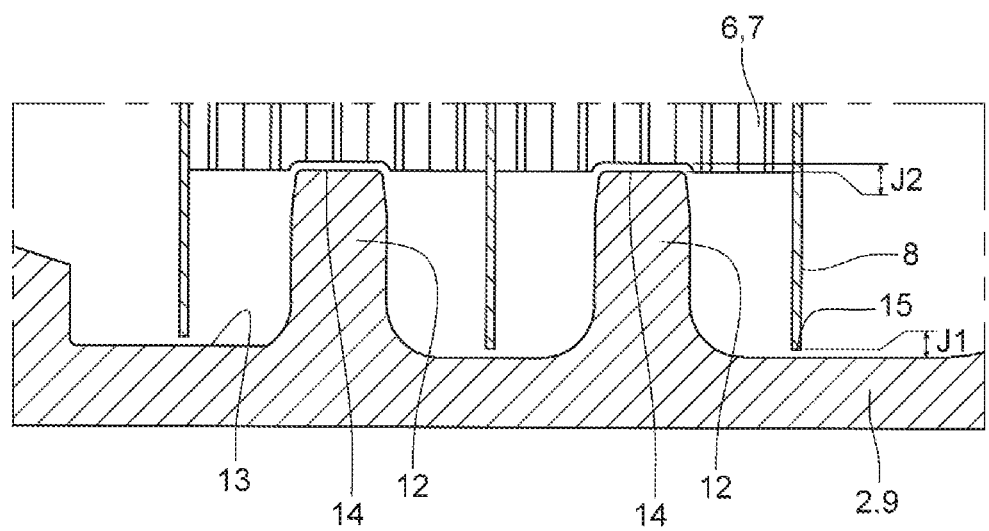

[Fig. 5]
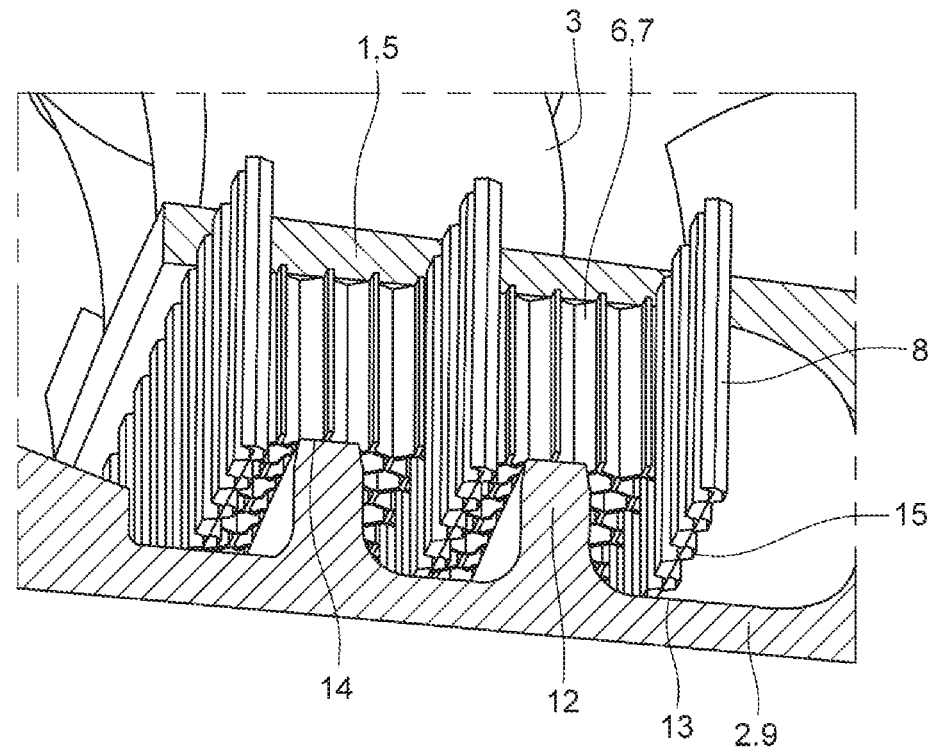
[Fig. 6]
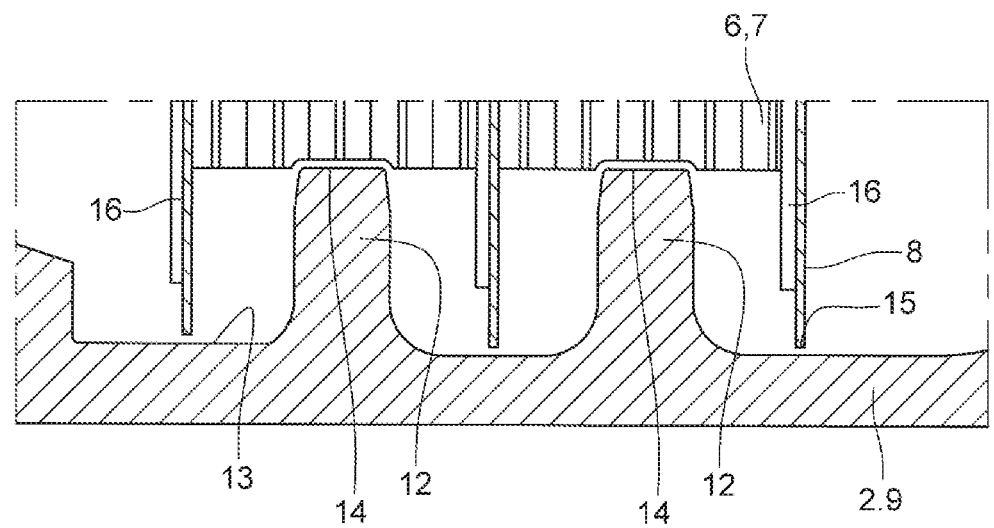

ASSEMBLY FOR A TURBOMACHINE

CROSS-REFERENCE TO RELATED APPLICATIONS

This application is a 35 U.S.C. § 371 filing of International Application No. PCT/FR2020/000009 filed Jan. 13, 2020, which claims the benefit of priority to French Patent Application No. 1900322 filed Jan. 14, 2019, and French Patent Application No. 1900420 filed Jan. 17, 2019, each of which is incorporated herein by reference in its entirety.

TECHNICAL FIELD OF THE INVENTION

The invention relates to an assembly for a turbomachine, such as, for instance, an aircraft turbojet engine or a turboprop engine.

PRIOR ART

FIG. 1 shows a turbomachine 1a with double flow and a dual body. The axis of the turbomachine is referenced X and corresponds to the axis of rotation of the rotating parts. In the following, the terms "axial" and "radial" are defined in relation to the X axis.

The turbomachine 1a has, from upstream to downstream in the direction of the flow of gases, a blower 2a, a low-pressure compressor 3a, a high-pressure compressor 4a, a combustion chamber 5a, a high-pressure turbine 6a and a low-pressure turbine 7a.

The air from fan 2a is divided into a primary flow 8a flowing into a primary annular vein 9a, and a secondary flow 10a flowing into a secondary annular vein 11a surrounding the primary annular vein 9a.

The low-pressure compressor 3a, the high-pressure compressor 4a, the combustion chamber 5a, the high-pressure turbine 6a and the low-pressure turbine 7a are located in the primary vein 9a.

The rotor of the high-pressure turbine 6a and the rotor of the high-pressure compressor 4a are coupled in rotation via a first shaft in order to form a high pressure body.

The rotor of the low-pressure turbine 7a and the rotor of the low-pressure compressor 3a are coupled in rotation via a second shaft in order to form a low-pressure body, the blower 2a being able to be connected directly to the rotor of the low-pressure compressor 3a or via an epicyclic gear train for example.

The high-pressure compressor 4a comprises a stator and a rotor capable of pivoting relative to the stator about the X axis of the turbomachine.

The rotor and the stator each comprise a succession of bladed wheels, each bladed wheel comprising a series of blades distributed around the axis of the turbomachine.

Each stator vane has a blade connected to a radially outer platform and a radially inner platform bounding the flow path of the airflow within the compressor. A block or ring of abradable material extends radially inward from the radially inner platform. The rotor comprises a shroud comprising an annular area, lugs extending radially outwardly from said annular area, the radially outer end of the lug co-operating with the block of abradable material so as to form a seal capable of providing a dynamic seal when in operation.

A structure of this nature is also known from document EP 3 023 595.

It turns out that, during operation, a relatively strong flow of air can pass between the upstream and downstream sides of the corresponding row of blades, through the radial clearance between the blades and the block of abradable material, which has a negative impact on the efficiency of the turbomachine.

DISCLOSURE OF THE INVENTION

The invention aims to remedy such drawback in a simple, reliable and inexpensive way. To this end, the invention relates to an assembly for a turbomachine, comprising a stator and a rotor capable of pivoting relative to the stator about an axis, the stator comprising blades each comprising a vane connected to a radially inner platform, a block of abradable material extending radially inwardly from the radially inner platform, the rotor having a shroud comprising an annular area, at least one lug extending radially outwardly from said annular area, the radially outer end of the lug cooperating with the block of abradable material, characterised in that the block of abradable material has a honeycomb structure comprising cells opening radially inwards, at least one tab extending radially inwards from the platform or the block of abradable material, the radially inner end of the tab cooperating with the annular zone of the stator shroud, the ratio+of the thickness e1 of the radially inner end of the tab, i.e. the axial dimension of said end of the tab, to the thickness e2 of the lug, i.e. the axial dimension of the lug, is less than 5, preferably less than 0.2.

The lug and the tab define, with the abradable material block and the annular zone of the shroud, baffles or obstacles making it possible to increase the pressure losses and to favour the dynamic sealing between the rotor and the stator so as to limit the leakage flow between the upstream and downstream of the blades. In other words, the above-mentioned elements form a labyrinth-like joint.

In addition, the fact of having a thin tab, i.e. a low e1/e2 ratio, increases the pressure drop and therefore the efficiency of the dynamic seal.

The terms 'upstream' and 'downstream' are defined with respect to the gas flows through the turbomachine.

The use of a block of abradable material in the form of a honeycomb makes it possible to better withstand high thermal stresses, particularly in the case of use in a turbomachine. Such a structure also makes it possible to limit the mass of the whole.

Having a thin tab also makes it possible to easily accommodate said tab in the available space while avoiding a risk of collision between the tab and the lug, in particular under the effect of the phenomenon of carriage. It is recalled that "carriage" is the axial displacement of the rotor in relation to the stator during operation, due in particular to the dimensional and assembly tolerances between these elements.

The tab and/or lug can extend only in a radial plane or can extend obliquely to the radial plane.

The number of tabs and/or lugs can vary according to requirements. For example, the assembly can comprise two or three lugs. The assembly can also include one, two or three tabs, for example.

The assembly can comprise a tab upstream of the lug(s), a tab downstream of the lug(s), and/or a tab axially between two lugs.

The thickness e2 of the lug can be at least equal to the axial dimension of the cells. In the case of cells of different sizes, the thickness e2 of the lug is at least equal to the largest axial dimension of the cells facing the lug.

This ensures that the gas flow cannot bypass the free end of the lug through the cells of the abradable material block.

The radially outer surface of the shroud can include a coating adapted to reduce wear on the shroud when friction occurs between the radially inner end of the tab and the shroud. The coating is for example an abrasive material.

The radial clearance J1 between the radially inner end of the tab and the shroud can be between 0.5 and 2 times the clearance J2 between the radially outer end of the lug and the abradable block.

This clearance can be measured in a particular configuration, for example hot or cold. If different materials can be used for the different elements, these materials deform differently under the effect of thermal stresses in particular.

The radial clearance J1 is for example less than 0.5 mm.

The blade, the radially inner platform, the abradable material block and the tab are made in one piece.

These elements are, for example, produced by additive manufacturing.

The tab can have a corrugated structure.

Such a structure makes it possible to increase the rigidity of the tab.

The profile of the corrugation can correspond to the general profile of the cells in the block of abradable material.

The tab can have a greater thickness, i.e. axial dimension, in a radially outer area of the tab than at its radially inner end.

Such an enlarged external area increases the rigidity of the tab and makes it less sensitive to vibrations. The radially inner end of the tab, however, retains a limited thickness, so as to reduce friction between the tab and the rotor shroud.

A stiffening plate can be laminated and mounted against an upstream or downstream face of the radially inner area of the tab.

Such a plate allows, as before, to increase the rigidity of the assembly of the tab and the stiffening plate. The plate and the tab can be made in one piece or as two separate elements. In the case of separate elements, the tab and plate are mounted so as to be free to move and to slide slightly relative to each other in operation, so as to allow friction between them and thus dampen vibrations.

The radially inner platform, the block of abradable material and the tab can be annular and sectorized, each sector comprising at least two blades connected to a radially inner platform sector, a block of abradable material and at least one tab extending radially inwardly from said platform sector.

The different angular sectors of the assembly form, after assembly, an annular assembly. The use of angular sectors makes it easier to assemble the unit.

The number of blades per sector is, for example, between 2 and 10.

The shroud and the lugs are also annular.

The invention also relates to a turbomachine comprising an assembly of the aforementioned type.

The assembly belongs, for example, to the compressor or turbine of the turbomachine.

BRIEF DESCRIPTION OF THE FIGURES

FIG. 1 is a schematic axial sectional view of a turbomachine of the prior art;

FIG. 2 is a perspective view of a rotor sector and part of the stator of an assembly according to a first embodiment of the invention;

FIG. 3 is a perspective view of a part of the assembly of FIG. 2;

FIG. 4 is a side view of a part of the assembly of FIG. 2;

FIG. 5 is a view corresponding to FIG. 3, illustrating a second embodiment of the invention;

FIG. 6 is a view corresponding to FIG. 4, illustrating a third embodiment of the invention.

DETAILED DESCRIPTION OF THE INVENTION

FIGS. 2 to 4 illustrate an assembly for a turbomachine according to a first embodiment of the invention.

The assembly comprises a stator 1 and a rotor 2 capable of pivoting relative to the stator about an axis X, which is the axis of the turbomachine.

The stator 1 is sectorised here, with only one sector shown in the figures.

Each sector comprises blades 3, extending radially between a radially outer platform 4 and a radially inner platform 5, delimiting the gas flow path within the turbomachine. The number of blades 3 per sector is for example between 2 and 10.

A block of abradable material 6 extends radially inwardly from the radially inner platform 5, the block of abradable material 6 has a honeycomb structure. The cells 7 have a hexagonal structure, extend radially and are open at their radially inner end.

In addition, planar tabs 8 extend radially inwardly from the radially inner platform 5, and more particularly from the radially inner side of the platform 5. The number of tabs 8 is here equal to three, the tabs 8 being evenly spaced axially from each other.

The tabs 8 and the abradable material block 6 are located entirely opposite the inner platform 5 and do not extend axially beyond said inner platform 5, so as to limit the axial bulk.

The tabs 8, the abradable material block 6, the platforms 4, 5 and the blades 3 are made in one piece, for example by additive manufacturing.

The rotor 2 has a shroud comprising a cylindrical annular portion 9 located axially between two rows of blades 10, 11, belonging to two compressor or turbine stages for example. lugs 12, in this case two lugs 12, extend radially outwardly from the cylindrical portion 9. The radially outer surface 13 of the cylindrical part has a wear resistant coating. The coating is, for example, an abrasive material which allows the tabs 8 to be worn away without damaging the cylindrical part 9.

The free ends 14 of the lugs 12, i.e. the radially outer ends 14 of the lugs 12, are adapted to cooperate with the radially inner surface of the abradable material block 6, so as to form a dynamic seal.

The free ends 15 of the tabs 8, i.e. the radially inner ends 15 of the tabs 8, are adapted to cooperate with the radially outer surface 13 of the cylindrical portion 9, so as to improve the efficiency of the dynamic seal. The profiles of the free ends 15 of the tabs 8 preferably have protruding angles, so as to increase the pressure losses.

A clearance J1 is provided between the radially inner ends 15 of the tabs 8 and the cylindrical portion 9. Similarly, a clearance J2 is provided between the radially outer ends 14 of the lugs and the abradable material block 6. These clearances J1, J2 can vary depending in particular on the effects of differential expansion.

In general, the clearance J1 is for example between 0 and 1 mm. More generally, the clearance J1 is between 0.5 and 2 times the clearance J2. It should be noted that, as the sealing is a direct function of the smallest section of the dynamic seal, having a clearance J1 greater than 2 times J2 has no appreciable impact on the effectiveness of the tabs 8.

The thickness e1 of each tab 8 is defined as the axial dimension of each tab 8 at its radially inner end.

The thickness of each lug 12 is defined by e2, i.e. the axial dimension of each lug 12. The ratio e1/e2 is, for example, less than or equal to 0.2.

More generally, the thickness e2 of each lug 12 is at least equal to the axial dimension of each cell 7 of the abradable material block 6. In this way, it is ensured that the gas flow cannot bypass the free end 14 of the lug 12 through the cells 7 of the abradable material block 6.

The lug 12 and the tab 8 define, together with the abradable material block 6 and the cylindrical part 9, baffles or obstacles allowing to increase the pressure losses and to favour the dynamic sealing between the rotor 2 and the stator 1 so as to limit the leakage flow between the upstream and downstream of the stator blades 1. In other words, the above-mentioned elements form a labyrinth-like joint.

The terms 'upstream' and 'downstream' are defined with respect to the gas flows through the turbomachine.

The use of a block of abradable material 6 in the form of a honeycomb makes it possible to better withstand high thermal stresses, particularly in the case of use in a turbomachine turbine. Such a structure also makes it possible to limit the mass of the whole.

The fact of having thin tabs 8, i.e. a low ratio e1/e2, makes it possible to easily accommodate the tabs 8 in the available space while avoiding a risk of collision between the tabs 8 and the lugs 12, in particular under the effect of the phenomenon of carriage. In addition, the use of thin tabs 8 increases the pressure drop and thus improves the efficiency of the dynamic seal. FIG. 5 illustrates a further embodiment in which each tab 8 has a corrugated structure with a corrugation profile substantially corresponding to the hexagonal profile of the cells 7 of the abradable material block 6. Such an embodiment increases the rigidity of the tab 8. FIG. 6 illustrates yet another embodiment in which a planar stiffening plate 16 is plated and mounted against an upstream or downstream face, here a downstream face, of the radially inner area of each tab 8.

Such a plate 16 makes it possible, as before, to increase the rigidity of the assembly of the tab 8 and the stiffening plate 16. The plate 16 and the tab 8 are two separate elements and are free to move and slide slightly relative to each other in operation, so as to allow friction between them and thus dampen vibrations in operation.

The invention claimed is:

1. An assembly for a turbomachine, comprising:
   a stator (1); and
   a rotor (2) rotatable relative to the stator (1) about an axis (X);
   the stator (1) comprising blades each comprising a vane (3) connected to a radially inner platform (5), a block of abradable material (6) extending radially inwardly from the radially inner platform (5)e;
   the rotor (2) having a shroud comprising an annular area (9), at least one lug (12) extending radially outwardly from said annular area (9), the radially outer end of the lug (12) cooperating with the block of abradable material (6);
   characterized in that the block of abradable material (6) has a honeycomb structure with cells (7) opening radially inwards, at least one tab (8) extending radially inwards from the platform (5) or the block of abradable material (6), the radially inner end (15) of the tab (8) cooperating with the annular area (9) of the stator shroud (1), the ratio e1/e2 of the thickness e1 of the tab (8) in the axial dimension of the tab (8), to the thickness e2 of the lug (12), in the axial dimension of the lug (12), is less than 5,
   wherein tab (8) has a corrugated structure with a corrugation profile substantially corresponding to the honeycomb structure of the cells (7).

2. The assembly according to claim 1, characterized in that the thickness e2 of the lug (12) is at least equal to the axial dimension of the cells (7).

3. The assembly according to claim 1, characterised in that the radially outer surface (13) of the shroud comprises a coating adapted to reduce wear of the shroud in the event of friction between the radially inner end (15) of the tab (8) and the shroud.

4. The assembly according to claim 1, characterized in that the radial clearance J1 between the radially inner end of the tab (8) and the annular zone (9) is between 0.5 and 2 times the clearance J2 between the radially outer end of the lug (12) and the abradable block (6).

5. The assembly according to claim 1, characterized in that the blade (3), the radially inner platform (5), the abradable material block (6) and the tab (8) are made of one piece.

6. The assembly according to claim 1, characterized in that the tab (8) has a corrugated structure.

7. The assembly according to claim 1, characterized in that the tab (8) has a greater thickness in the axial dimension, in a radially outer area of the tab (8) than at its radially inner end.

8. The assembly according to claim 1, characterised in that a stiffening plate (16) is pressed against and mounted on an upstream or downstream face of the radially inner area of the tab (8).

9. The assembly according to claim 1, characterised in that the radially inner platform (5), the block of abradable material (6) and the tabs (8) are annular and sectorised, each sector comprising at least two blades (3) connected to a radially inner platform sector (5), a block of abradable material (6) and at least one tab (8) extending radially inwardly from said platform sector (5).

10. A turbomachine according to claim 1.

11. The assembly according to claim 1, wherein the ratio e1/e2 is less than 0.2.

12. An assembly for a turbomachine, comprising:
    a stator (1); and
    a rotor (2) rotatable relative to the stator (1) about an axis (X);
    the stator (1) comprising blades each comprising a vane (3) connected to a radially inner platform (5), a block of abradable material (6) extending radially inwardly from the radially inner platform (5);
    the rotor (2) having a shroud comprising an annular area (9), at least one lug (12) extending radially outwardly from said annular area (9), the radially outer end of the lug (12) cooperating with the block of abradable material (6);
    characterized in that the block of abradable material (6) has a honeycomb structure with cells (7) opening radially inwards, at least one tab (8) extending radially inwards from the platform (5) or the block of abradable material (6), the radially inner end (15) of the tab (8) cooperating with the annular area (9) of the stator shroud (1), the ratio e1/e2 of the thickness e1 of the tab (8) in the axial dimension of the tab (8), to the thickness e2 of the lug (12) in the axial dimension of the lug (12), is less than 5, preferably less than 0.2; and wherein the radial clearance J1 between the radially inner end of the tab (8) and the annular zone (9) is between 0.5 and 2 times the clearance J2 between the radially outer end of the lug (12) and the abradable block (6), and tab (8) has a corrugated structure with a corrugation profile substantially corresponding to the honeycomb structure of the cells (7).

13. The assembly according to claim 12, characterized in that the blade (3), the radially inner platform (5), the abradable material block (6) and the tab (8) are made of one piece.

14. The assembly according to claim 12, characterized in that the tab (8) has a corrugated structure.

15. The assembly according to claim 12, characterized in that the tab (8) has a greater thickness in the axial dimension, in a radially outer area of the tab (8) than at its radially inner end.

16. The assembly according to claim 12, characterised in that a stiffening plate (16) is pressed against and mounted on an upstream or downstream face of the radially inner area of the tab (8).

17. The assembly according to claim 12, characterised in that the radially inner platform (5), the block of abradable material (6) and the tabs (8) are annular and sectorised, each sector comprising at least two blades (3) connected to a radially inner platform sector (5), a block of abradable material (6) and at least one tab (8) extending radially inwardly from said platform sector (5).

18. A turbomachine according to claim 12.

19. The assembly according to claim 12, wherein the ratio $e1/e2$ is less than 0.2.

\* \* \* \* \*